United States Patent

Kätker et al.

[11] Patent Number: 5,917,831
[45] Date of Patent: Jun. 29, 1999

[54] SYSTEM FOR TESTING A DATA-TRANSMISSION NETWORK

[75] Inventors: Stefan Kätker, Heidelberg; Martin Paterok, Eppelheim, both of Germany

[73] Assignee: International Business Machines Corporations, Armonk, N.Y.

[21] Appl. No.: 08/776,718
[22] PCT Filed: May 23, 1995
[86] PCT No.: PCT/EP95/01962
   § 371 Date: Jan. 21, 1997
   § 102(e) Date: Jan. 21, 1997
[87] PCT Pub. No.: WO96/05676
   PCT Pub. Date: Feb. 22, 1996

[30] Foreign Application Priority Data

Aug. 6, 1994 [DE] Germany ............................. 44 28 132

[51] Int. Cl.⁶ .................................................. G01R 31/28
[52] U.S. Cl. ..................................... 371/20.1; 395/183.07; 395/200.67
[58] Field of Search .................................. 371/20.1, 20.5, 371/20.6, 30, 32, 33, 34, 68.2; 395/182.02, 183.19, 183.01, 183.04, 185.02, 200.54, 200.67, 200.57, 200.79, 200.81, 200.82, 200.83; 364/204.9, 242.94, 242.95, 242.96, 284, 284.3, 284.4, 240.9; 370/217, 218, 248, 249, 254, 400, 406

[56] References Cited

U.S. PATENT DOCUMENTS

| | | | |
|---|---|---|---|
| 4,745,593 | 5/1988 | Stewart | 370/244 |
| 4,977,499 | 12/1990 | Banning et al. | 395/200.67 |
| 5,095,444 | 3/1992 | Motles | 395/200.54 |
| 5,170,393 | 12/1992 | Petterson et al. | 370/255 |
| 5,241,534 | 8/1993 | Omuro et al. | 370/218 |
| 5,404,565 | 4/1995 | Gould et al. | 395/200.67 |

FOREIGN PATENT DOCUMENTS 0347360 5/1989 European Pat. Off. .

OTHER PUBLICATIONS

IBM, TDB, vol. 24, No. 10, Mar. 1982, pp. 4974, 4977–4978 "Method for Dynamic Distributed Generation of Explicit Routes".

International Search Report.

*Primary Examiner*—Trinh L. Tu
*Attorney, Agent, or Firm*—John J. Timar

[57] ABSTRACT

A method is described by which a data communication network can be tested. The network consists of a number of nodes which are connected to each other. At least one of the nodes is designated to the user as be inaccessible from a first node (A). Data are available within the network which, starting from the first node indicate the path to the node which is designated as being inaccessible. An interrogation is carried out to determine which is the nearest node, starting from the first node, on the path to the node which is designated as inaccessible. This nearest node is then directed to determine whether the interrogated nearest node is accessible. If this is the case, another interrogation is performed to determine which is the nearest node, now starting from the already reached node, on the path to the node which is designated as inaccessible. Another test is performed to ascertain if the new nearest node is accessible. This interrogation and testing are repeated until an interrrogation nearest node is not accessible. This inaccessible node is then recognized as defective, and this is communicated to the user. In this manner, a test system is presented which can automatically and quickly detect a defective node in the date-communication network and is indicate this to the user.

7 Claims, 5 Drawing Sheets

| NODE | A |
|---|---|
| DESTINATION NODE | B C D E F G H I |
| NEXT NODE | B B B B B G G I |

FIG. 2A

| NODE | B |
|---|---|
| DESTINATION NODE | C D E F |
| NEXT NODE | C C C C |

FIG. 2B

| NODE | C |
|---|---|
| DESTINATION NODE | D E F |
| NEXT NODE | D E E |

FIG. 2C

| NODE | E |
|---|---|
| DESTINATION NODE | F |
| NEXT NODE | F |

FIG. 2D

SYSTEM FOR TESTING A DATA-TRANSMISSION NETWORK

BACKGROUND OF THE INVENTION

The invention concerns a procedure for testing an electrical network for data transmission.

In data-transmission and data-communication technology, a number of nodes are linked together through a network. As a node, a computer system as an example or a similar system may be available, and as a network, optical-fiber cables arranged in a star-like configuration may be provided, for example. With the help of existing transmission mechanisms, it is possible that data from one of the nodes can be transmitted through the network to any other arbitrary node.

This kind of transmission mechanism consists in making information available which, proceeding from a first node, indicates the path to a destination node. If data from the first node are to be transmitted to the destination nodes, then, based on this information, the first node can determine which is the next node to which it must send the data on the way to the destination node. This next node, using the information specified above, can determine in the same manner the next node on the path to the destination node and send the data correspondingly. This is repeated until the data reach the destination node and the transmission of the data is completed successfully.

It is possible that one of the nodes of the network has a defect, and that a transmission of information through this node is therefore impossible. This has the result that not only is the node which is impaired by the defect no longer accessible, but any other nodes which are arranged beyond the defective node on the path to an arbitrary destination node, and are hence "in the shadow" of the defective node, are also inaccessible. Typically, all of these nodes are viewed as inaccessible from the first node, therefore there is no differentiation between the nodes located "in the shadow" and which are thus not necessarily defective nodes, and the actual defective node.

It is conceivable that, in a large network, a defect in one single node has as a result that a large number of nodes lie "in the shadow." All of these nodes are regarded, as mentioned above, as inaccessible without differentiation as seen from the first node. Based on the large number of nodes reported alone it is hardly possible for a user to detect the actual defective node and then eliminate the defect.

SUMMARY OF THE INVENTION

It is the object of the invention to create a test system which makes possible the detection of the actual defective node.

This object is achieved in accordance with the invention by the sequential interrogation and testing of nodes along the path to the destination node. The invention makes a test system available by which the actual defective node in the network is automatically detected. In this way it is possible to differentiate between the nodes located "in the shadow" and the actual defective node. A user is hence placed in the position where he can concentrate immediately on the defect of the defective node. The defect can be eliminated quickly without trial and error. No time is lost for testing of the nodes which are "in the shadow." The defect in the network can therefore be eliminated more quickly and the availability of the network is increased. It is clear that this can result in significant cost savings, especially in large networks.

By storing path information at each node along the path to the destination node, the interrogation and testing steps can be consolidated into one step. The test system in accordance with the invention is thus further simplified, and the availability of the network is further increased.

The actual testing of the next node on the path to determine accessibility can be achieved by sending a status query message to that node. Alternatively, the status query can be, in effect, a status message which is automatically generated at periodic time intervals by the node being tested. In both instances, the test system in accordance with the invention receives the information required for the test in accordance with step (b) so that the detection of the node which is actually defective is possible in the manner described herein.

By sequentially interrogating and testing nodes on the path to the destination, a differentiation between the actual defective node and the nodes located "in the shadow" is achieved. Through this it is possible to indicate to a user the actual defective node(s) and their consequent errors "in the shadow" clearly separated from one another.

The invention can also be implemented in a multi-level data communication system, for example, communication between two nodes at the network (Internet Protocol) level which are physically connected through a plurality of local area networks and interconnect devices, such as bridges, switches and routers. If a node is recognized as defective in an upper level of a communication system, then the search in the subordinate level can be continued and refined by sequentially interrogating and testing each next node on the subordinate level until the defective node is found. It is thus possible that the test system not only recognizes one node as defective, but beyond that can also indicate, for example, which interface is defective in the node. Repairs of defects are further simplified for the user through this subordinate level search. This in turn has the immediate consequence that the availability of the network is increased.

BRIEF DESCRIPTION OF THE DRAWINGS

Further benefits and configurations of the invention ensue from the following description of an embodiment of the invention which is represented in the accompanying drawings.

FIGS. 2A–2D show a tabular representation of the information on the path to specific destination nodes

DETAILED DESCRIPTION OF THE PREFERRED EMBODIMENTS

Figure 1:
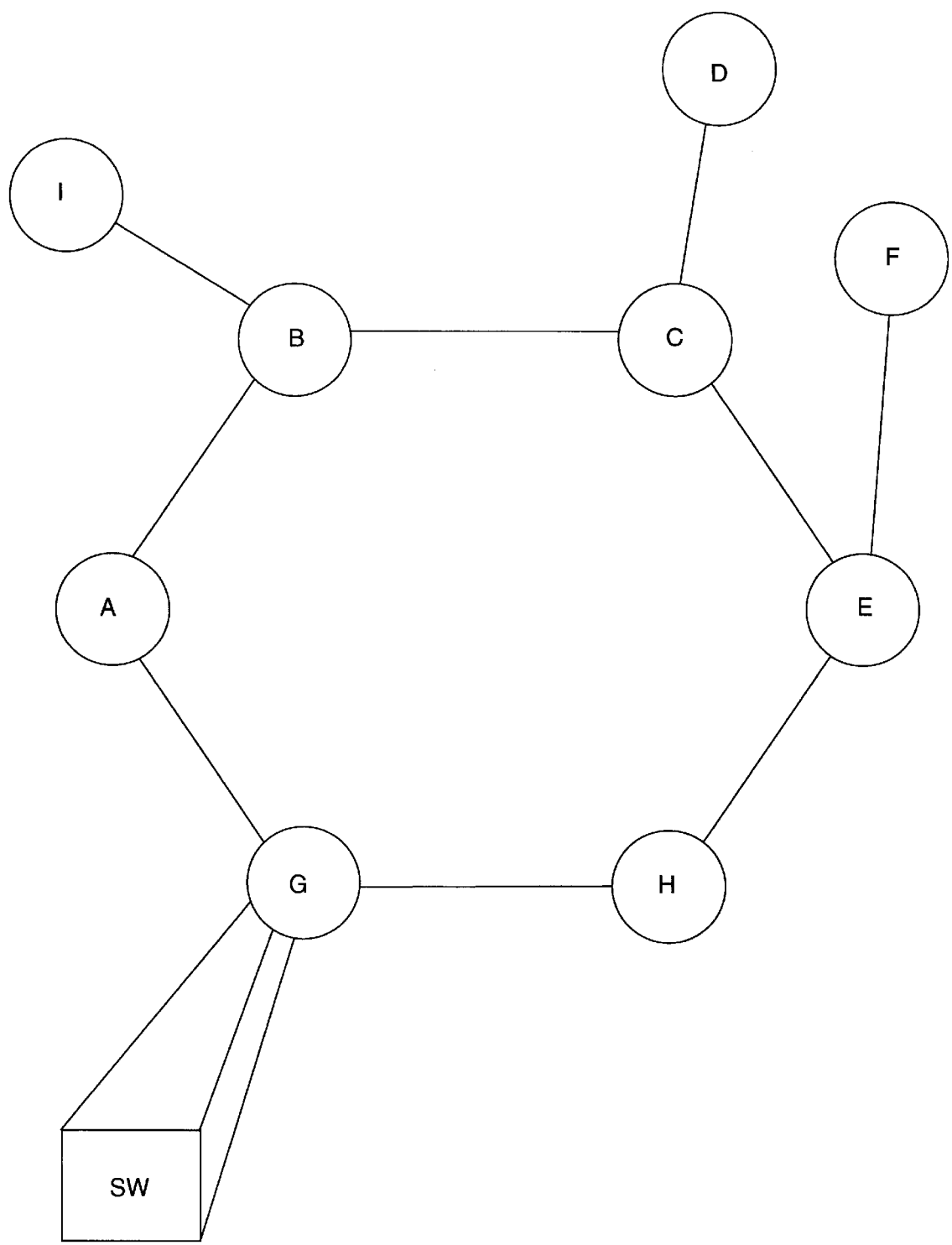
FIG. 1 shows a schematic representation of an electrical network for the transmission of data with a number of nodes which are connected with each other.

The network represented in FIG. 1 includes, as an example, nine nodes A to I, which are connected to each other through links which are not described in any more detail. The nodes A, B, C, E, H and G form a ring, while node I is linked with node A, node D with node C and node F with node E respectively. Node A is the start node or first node, from which data are to be transmitted to other nodes. Furthermore, a means SW is allocated to node A, more particularly software for data transmission, with the help of which predefined transmission mechanisms and the like may be implemented in the network.

Information is contained in the individual nodes A to I of the network which indicates the next respective node located on the path from the first node A to a specific destination node. It may therefore be concluded from FIG. 2a, for example, that for a data transmission from the first node A to node E, the data must first be sent to node B. It may correspondingly be concluded from FIG. 2c, that in a transmission of data from node A to node E which starts at node C, that node E itself is the next node to which the data are to be sent.

If data are to be transmitted from node A to the designated node E, then node A determines first by means of the software data of FIG. 2a which is stored in its own memory, the next node to which it must send the data on the path to node E. This is, as illustrated in FIG. 2a and as illustrated mentioned above, node B. Node A thus transmits the data to node B. A corresponding sequence of events is now processed in node B, that is, node B determines based on FIG. 2b that it must send data to node C. Once the data have arrived at node C, node C immediately ascertains the node to which it has to send the data on the way to node E. According to FIG. 2c, this is node E itself.

Node C therefore transmits the data to node E. The entire data transmission is thus completed.

Let it now be assumed that node C is defective, that there is a defect in node C which makes the transmission of data impossible. As a consequence the nodes D, E and F, which lie "in the shadow" of node C, are equally inaccessible starting from node A. With the specific help of the means SW, it will then be reported in the form of an error message that nodes C, D, E and F are not accessible for a data transmission and cannot be reached.

Figure 3:
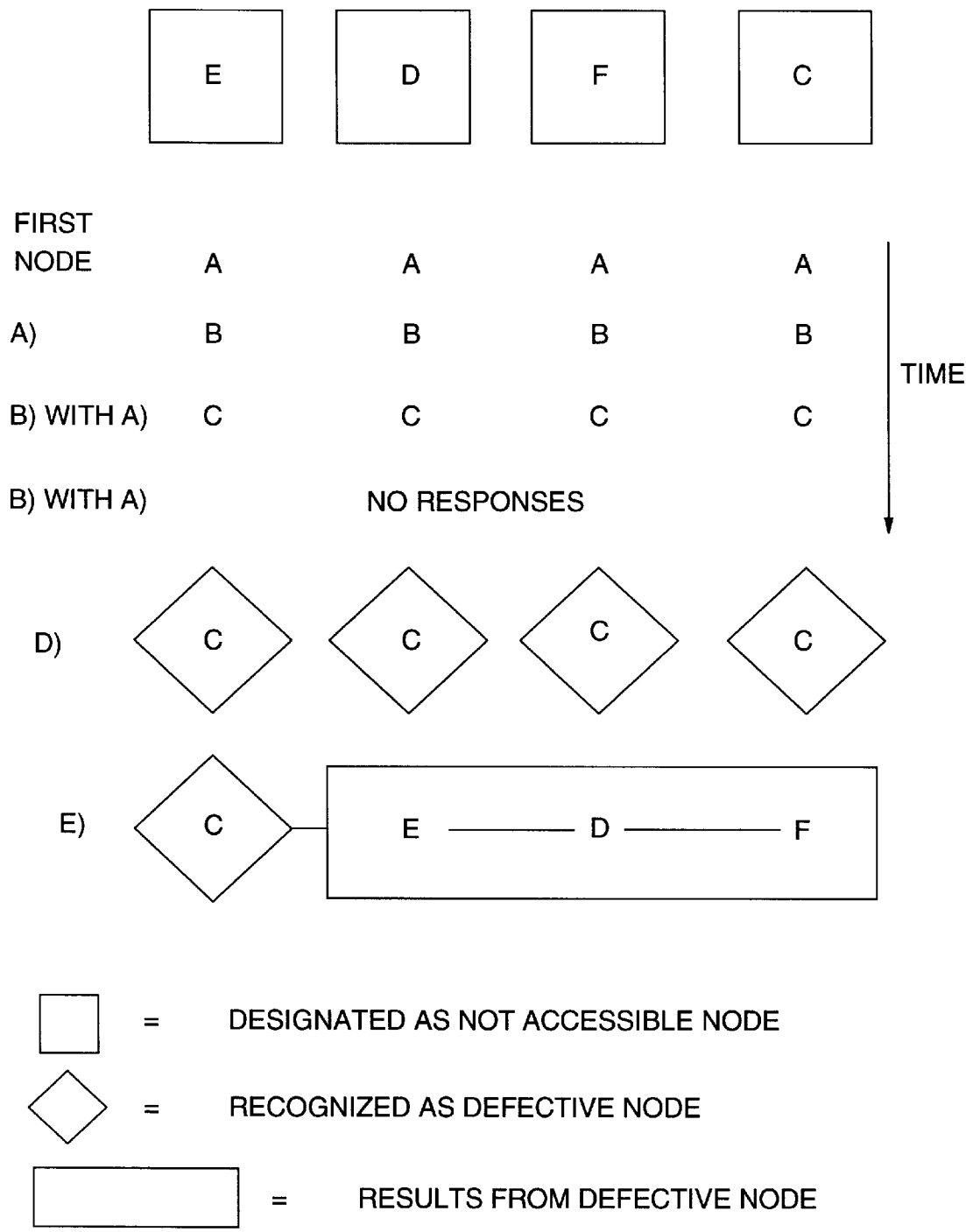
FIG. 3 shows a schematic representation of the procedure for testing the network according to FIG. 1.

As illustrated in FIG. 3, the nodes C, D, E and F are thus designated in node A as not accessible. Specifically with the help of the means SW, the attempt will now be made to detect the actual defective node. To achieve this purpose, an interrogation will be carried out first to determine which is the next node on the path to the node designated as inaccessible. This interrogation and testing is repeated as long as is necessary until the next interrogated node is inaccessible. In this case, the next accessible node is defective.

Thus, as illustrated in FIG. 3, starting from the first node A, there is an interrogation in a first step to determine which is the next respective node on the path to nodes C, D, E and F, which have been designated as inaccessible. Based on FIG. 2a, this is node B in every instance. Node A now directs the query to node B to determine which node, proceeding from node B, is the next node on the path to the nodes C, D, E and F, which has been designated as inaccessible. Node B responds to this query with the answer that node C is the next node sought. From the response which node A receives from node B, node A concludes that node B is not defective. Node A now sends a query to node C to determine which node, proceeding from node C, is the next node to the nodes E, D and F which have been designated as inaccessible. Based on FIG. 3, node A does not receive any responses to this query. From this, node A concludes that there is a defect in node C which makes the transmission of data impossible. Node C is thus recognized as defective and can be designated as such. The additional nodes D, E and F which have been designated as inaccessible may now be viewed as sequence errors of the defective node C.

As an alternative to FIGS. 2A to 2D and 3, it is possible that the information of FIGS. 2A to 2D is not contained in the individual nodes, but is stored entirely in node A, and especially in the assigned means SW. As a consequence node A does not have to interrogate the individual nodes for the data FIGS. 2A to 2D, as described, but rather can interrogate for this which is stored directly in node A. The first step, that is, the interrogation to determine which is the next node on the path to the inaccessible node, can thus be carried out directly in node A. The test to determine whether the next node is accessible can occur in two different ways.

It is first possible that node A sends a status query to the relevant next node. If node A receives a response to this status query, then the next node is accessible and thus not defective. On the other hand, if a response is not received, then the next accessible node is detected as defective.

Secondly, it is possible that node A waits until a status message which is automatically generated by the next relevant node is received. Such status messages are generated by the nodes of certain communication systems automatically at specific time intervals in order to communicate the status of the sending node to each of the other nodes. If node A has received this type of status message from the next relevant node, this means that this next node is accessible, in other words not defective. If node A does not receive such a status message, then a defect may be concluded in the next relevant node.

For connection-oriented network protocols, the tables depicted in FIGS. 2A to 2D may be constructed differently. It is possible here that it is not the destination node which is indicated, but rather an un ambiguous connection identification which is derived at the start node. However, the procedure as described herein is not affected by this.

Figure 4:
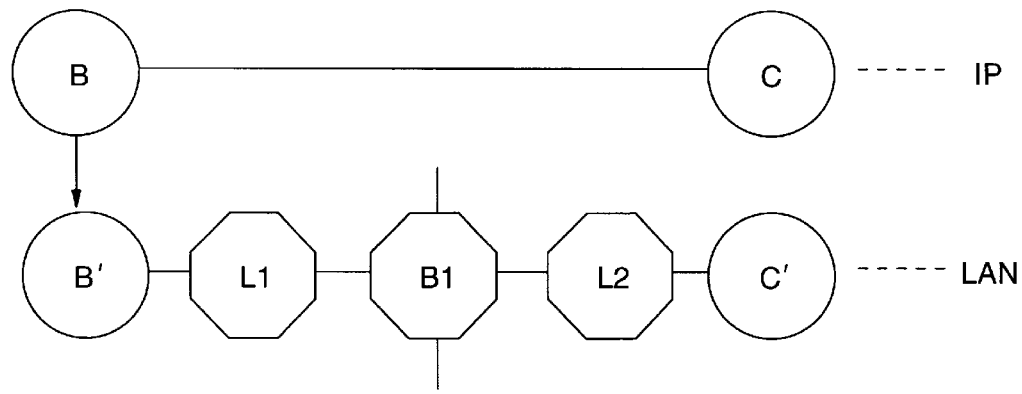
FIG. 4 shows a schematic representation of two different levels of the network according to FIG. 1.
Figure 5:
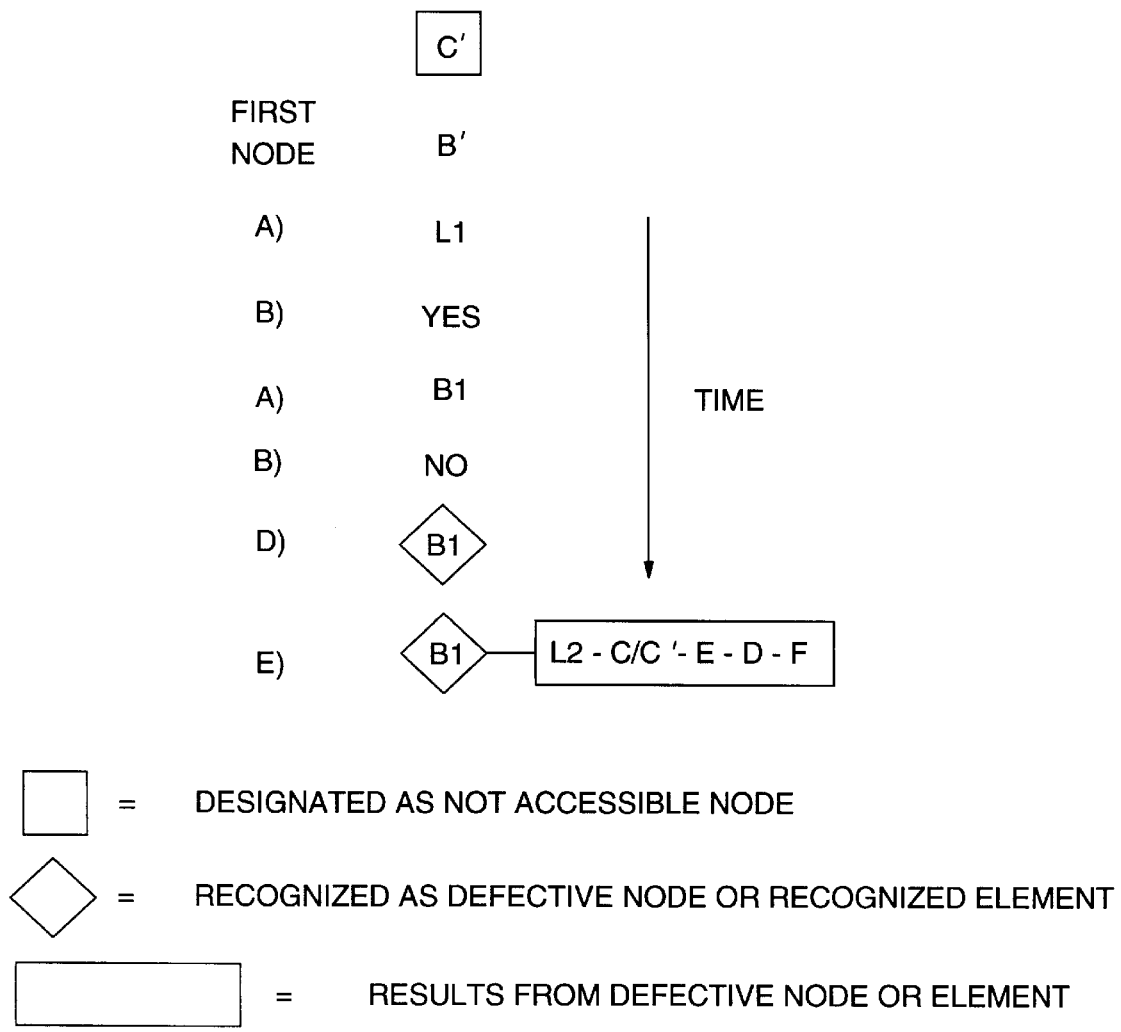
FIG. 5 shows a schematic representation of the procedure for testing the different levels of the network according to FIG. 4.

FIGS. 4 and 5 concern a link from an upper level of the transmission and communication system to a subordinate level. Thus, the network represented in FIG. 1 is represented in FIG. 4 as the upper level, specifically as the so-called network level, for example as an IP level (IP=Internet Protocol). The subordinate level displayed in FIG. 4 is, for example, a LAN level (LAN=Local Area Network). While the upper IP level based on FIG. 4 only depicts the two nodes B and C, the connection between the nodes B and C is realized through further elements of the subordinate LAN level. Therefore, as illustrated in FIG. 4, a first segment L1, a bridge B1 and a second segment L2 are arranged between node B' of the LAN level, which corresponds to node B of the IP level, and node C', which corresponds to node C. These two segments L1 and L2 may be LAN segments which are coupled with each other by the bridge B1.

As was explained above in the discussion of FIG. 3, node C of the network of FIG. 1 has been detected as defective. In node A, especially in the assigned software means SW, information (data) is provided which is utilized to enable a link of the nodes of the upper IP level and the subordinate LAN level. This means that node C' of the LAN level can be allocated to node C of the IP level. The same is true for node B of the IP level and node B' of the LAN level.

As depicted in FIG. 5, the procedure already described and illustrated in FIG. 3 is executed once again. Here, the node C' is designated as inaccessible and node B' takes the place of the "first" node.

First, there is an interrogation to determine which is the next node, proceeding from node B', on the path to node C' which has been designated as inaccessible. This is the element L1. It will now be tested to determine if L1 is accessible.

This may be performed either through the status query already described or the automatic condition message which has also been described previously. As indicated in FIG. 5, the result of this test is that the element L1 can be accessed. There is now a further interrogation to determine which element, proceeding from element L1, is the next element on the path to the node C'. This is the element B1. A corresponding status query or status message as illustrated in FIG. 5, indicates that the element B1 is not accessible. This means that the element B1 is detected as defective. This may now be designated accordingly. The elements and nodes which are located "in the shadow" may now be seen as results of the defective element, also designated accordingly, and displayed to the user if applicable.

The procedure described and illustrated in FIG. 4 and FIG. 5 can be applied in a corresponding manner on higher and lower levels of the communication system. It is equally possible to expand the procedure across more than two levels.

Figure 6:
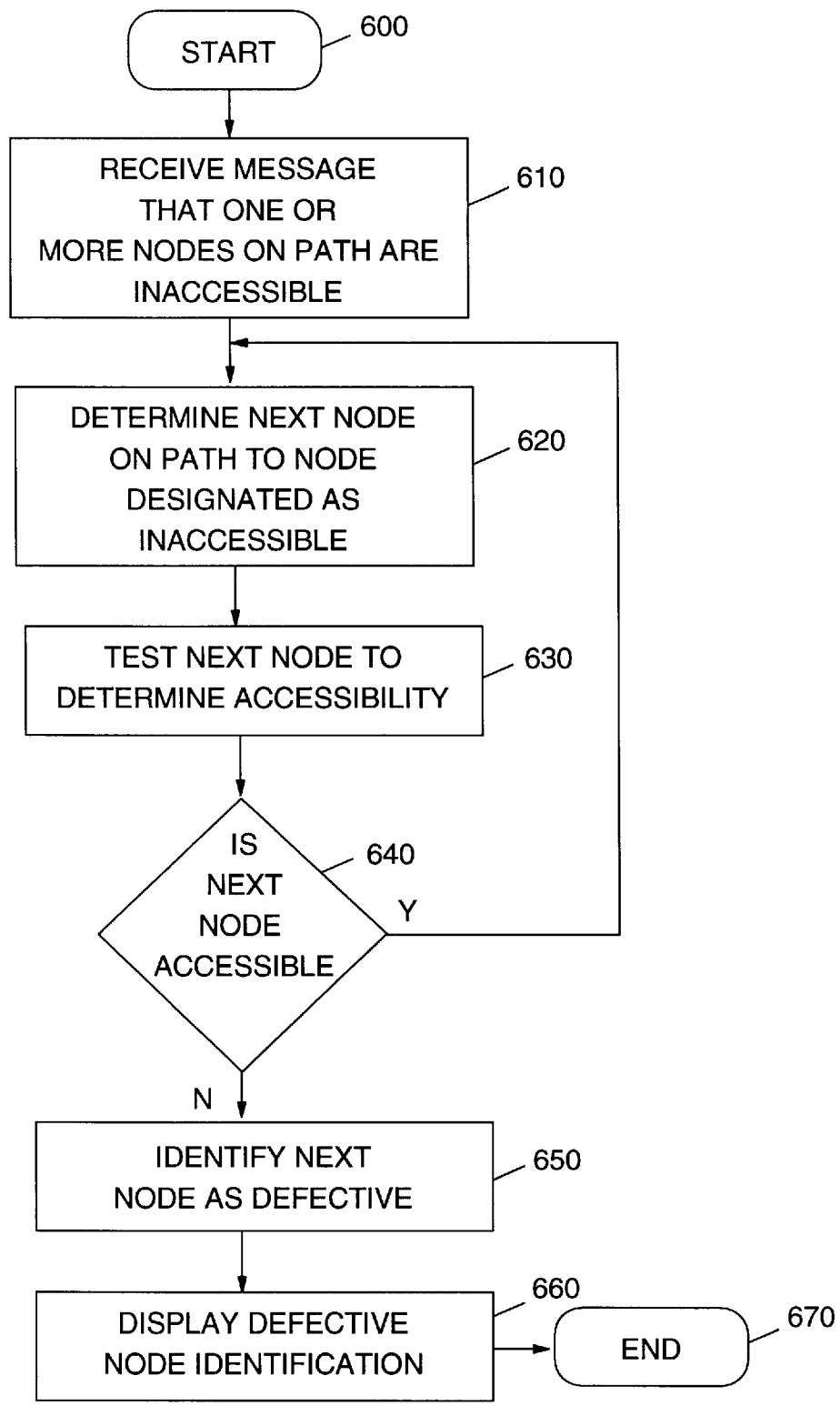
FIG. 6 shows a flowchart of the logic steps performed in the present invention to isolate a defective node.

A flowchart depicting the processing done by the software of the present invention to test and identify a defective node along a path from a source node to a destination node is illustrated in FIG. 6. The algorithm is entered in logic block 600. As indicated in logic block 610, a source (or first) node has received a message that one or more nodes are inaccessible from the source node. In the context of FIG. 1 along a path from node A to node E, if node C fails, then nodes C, D, E and F would be determined inaccessible. The next step, in logic block 620, is to determine the next node on the path to the node designated as inaccessible. This step can be accomplished by the source node checking data stored at the source node that identifies each node along the path to the destination, or by the source node sequentially sending a query to each node along the path asking each such queried node to identify the next node along the path to a node designated as inaccessible. In logic block 630, the source node tests the next node to determine its accessibility. This can be in the form of sending a status query from the source node to the node tested, or in the form of waiting for a periodic status report message from the node being tested to the source node. The actual test on the next node's accessibility is indicated by decision block 640. This determination is made based on receiving a response from the next node tested. If a response is received, then the node is accessible, and processing returns to logic block 620 to determine the next node to be tested. If the next node does not respond to the query from the source node, then the next node is defective and is identified as such in logic block 650. This test step can also be effected by analyzing the periodic status messages that are generated by the tested node and sent to a source node. The nodes that are "in the shadow" of the defective node also have their inaccessible designation removed. In logic block 660, the identified defective node is displayed on a monitor at the source node to indicate to the network user or manager where the failure occurred. The process then exits as indicated in logic block 670. The process depicted in FIG. 6 also applies to a multilevel data communication system in which node inaccessibility is indicated at the network layer level (e.g. TCP/IP network) and testing is done at the data link layer level (e.g. interconnected LANs). FIG. 6 then indicates the processing performed at the data link level.

While the invention has been particularly shown and described with reference to the particular embodiment thereof, it will be understood by those skilled in the art that various changes in form and detail may be made therein without departing from the spirit and scope of the invention.

Having thus described our invention, what we claim and desire to secure as Letters Patent is as follows:

1. A method for testing an electrical network for data transmission, wherein the network has a plurality of nodes that are connected to each other, with at least one node proceeding from a first node along a path to a destination node designated as inaccessible, and wherein data are stored at one or more nodes along the path, proceeding from the first node, to indicate the path to the node designated as inaccessible, said method comprising:

(a) performing an interrogation by the first node to determine a next node on the path to the node designated as inaccessible proceeding from the first node;

(b) testing the next node on the path to determine whether the interrogated next node is accessible;

(c) repeating steps (a) and (b) until the interrogated next node is inaccessible; and (d) in the event the interrogated next node is inaccessible, recognizing the interrogated next node as defective.

2. The method in accordance with claim 1, wherein the data indicating the path are stored in each respective node and wherein the interrogation performed in accordance with step (a) is directed at each respective node by said first node, and the testing by said first node in accordance with step (b) is derived from a response of each respective node to said interrogation.

3. The method in accordance with claim 1, wherein the data for administration of the network is stored in a software means at said first node, and wherein the testing by said first node in accordance with step (b) is derived from a response to a condition interrogation sent by said first node.

4. The method in accordance with claim 1, wherein the data for the administration of the network is contained in a software means at said first node, and wherein the testing by said first node in accordance with step (b) is derived from a status message which is automatically generated by said next node at specified time intervals.

5. The method in accordance with claim 1 further, comprising:

(e) if more than one node is designated as inaccessible, determining that the designated inaccessibility of each inaccessible node other than the defective node to be a consequential result of the defective node preceding the designated inaccessible node along the path to the designated inaccessible node.

6. The method in accordance with one of the claims 1 to 5, wherein the data stored at one or more nodes along the path may be utilized to create a connection from an existing level of the network for data transmission to a subordinate level of the network for data transmission, further comprising the additional steps:

(f) determining the node on the subordinate level of the network for data transmission that corresponds to the node preceding the node detected as defective on the existing level of the network for data transmission; and (g) proceeding from said corresponding node on the subordinate level, repeating steps (a) to (d) until the next node recognized as defective on the subordinate level is detected.

7. The method in accordance with claim 1, including the additional step:

(e) displaying to the user each next node determined to be defective.

* * * * *